(12) United States Patent
Freudenberg et al.

(10) Patent No.: US 11,928,275 B2
(45) Date of Patent: Mar. 12, 2024

(54) SYSTEMS AND METHODS FOR CONTROL OF A VIRTUAL WORLD

(71) Applicant: CEO Vision, Inc, Cary, NC (US)

(72) Inventors: Vanessa Ada Freudenberg, Los Angeles, CA (US); Aran Lunzer, Los Angeles, CA (US); Yoshiki Ohshima, Valley Village, CA (US); David A. Smith, Cary, NC (US); Brian Upton, Los Angeles, CA (US)

(73) Assignee: CEO Vision, Inc, Cary, NC (US)

( * ) Notice: Subject to any disclaimer, the term of this patent is extended or adjusted under 35 U.S.C. 154(b) by 0 days.

(21) Appl. No.: 18/058,259

(22) Filed: Nov. 22, 2022

(65) Prior Publication Data
US 2023/0236687 A1    Jul. 27, 2023

Related U.S. Application Data

(63) Continuation of application No. 17/551,069, filed on Dec. 14, 2021, now Pat. No. 11,537,227.
(Continued)

(51) Int. Cl.
*G06F 3/041*   (2006.01)
*G06K 7/14*    (2006.01)
*H04W 84/04*   (2009.01)

(52) U.S. Cl.
CPC ........... *G06F 3/0412* (2013.01); *G06K 7/143* (2013.01); *H04W 84/042* (2013.01)

(58) Field of Classification Search
CPC .. H04W 4/20; H04W 84/042; H04L 67/1095; H04L 67/131; G06K 7/143; G06F 3/0412
See application file for complete search history.

(56) References Cited

U.S. PATENT DOCUMENTS

| 11,537,227 B2 * | 12/2022 | Freudenberg ......... G06F 3/0412 |
| 2003/0037109 A1 * | 2/2003 | Newman ................. H04L 65/70 709/204 |

(Continued)

OTHER PUBLICATIONS

ISA/US, "Notification of Transmittal of the ISR and the Written Opinion of the International Searching Authority, or the Declaration," in PCT Application No. PCT/US2021/063614 dated May 3, 2022, 8 pages.

*Primary Examiner* — Robin J Mishler
(74) *Attorney, Agent, or Firm* — Kang S. Lim

(57) ABSTRACT

Systems and methods for a controlling a shared virtual environment are provided. The systems and methods includes a public display connects to a reflector via a network. A shared virtual environment is replicated on the public display. A QR code is displayed on the public display for scanning by a mobile device. The QR code includes instructions to download a controller interface and location of the reflector. The mobile device provides inputs, via the reflector, to the shared virtual environment. This causes mirroring of computations on each of the plurality of objects across the shared virtual environment deterministically. Further, a new message from the reflector with an appended timestamp is transmitted to advance time within the public display. Inputs from the mobile device may include a touchscreen input corresponding to rendered joysticks and buttons, and/or an accelerometer input after position of the mobile device has been calibrated related to the public display.

20 Claims, 16 Drawing Sheets

Related U.S. Application Data

(60) Provisional application No. 63/127,144, filed on Dec. 17, 2020.

(56) References Cited

U.S. PATENT DOCUMENTS

| | | | |
|---|---|---|---|
| 2015/0182856 A1 | 7/2015 | Mays, III et al. | |
| 2017/0295235 A1* | 10/2017 | Guo | H04L 41/122 |
| 2018/0239144 A1 | 8/2018 | Woods et al. | |
| 2020/0114253 A1 | 4/2020 | Maruyama et al. | |
| 2020/0126352 A1* | 4/2020 | Jin | G07F 17/3209 |
| 2020/0259896 A1 | 8/2020 | Sachs et al. | |
| 2020/0382232 A1 | 12/2020 | Smith et al. | |
| 2021/0390823 A1 | 12/2021 | Dalmia | |

* cited by examiner

SYSTEMS AND METHODS FOR CONTROL OF A VIRTUAL WORLD

CROSS REFERENCE TO RELATED APPLICATION

This U.S. non-provisional application claims the benefit and priority of U.S. provisional application No. 63/127,144, filed Dec. 17, 2020. Additionally, this U.S. non-provisional application claims the benefit and priority and is a Continuation of U.S. application Ser. No. 17/551,069 currently pending, which all applications are incorporated herein in their entirety by this reference.

BACKGROUND

The present invention relates to systems and methods for a computing architecture focused on deep collaboration between teams of users inside a 3D shared space. Particularly as shared public virtual space is provided, that enables users to access and control the environment using their mobile devices.

Marketing and promotions rely upon many channels. These may include print, electronic and direct marketing advertisements. These advertisements generally are static (or a dynamic video or clip), and aimed at getting a potential consumer's attention. In a few instances, an interactive advertisement is possible. These generally include the user clicking on an electronic advertisement and being redirected to a game or some other interactive activity. Generally however, these interactive advertisements are found on electronic pages that are already very engaging (e.g. Facebook, etc.). As such, the level of user engagement is generally reduced, as the ads are competing with other compelling content.

In contrast, there are many situations where there is a captive audience with less distractions, who may be particularly susceptible to consuming an advertisement. For example, an individual at a bus stop, waiting for their bus, may be particularly primed to receive advertising materials. As such, these locations often have static or dynamic advertisements already in place in the form of billboards (print or video). However, these advertisements are never interactive due to technical limitations in administering such an interactive platform.

Recently however, new architectures that allows for improved shared virtual experiences that are near infinitely scalable, low bandwidth that also maintain perfect fidelity have been developed. Such systems would result significantly reduced latencies through the usage of decentralized and secure message reflectors. It is contemplated that such systems bay be merged with the advertising space to allow for interactive advertisements in locations that historically could not be accessed. Of course, control of such environments is still a hurdle to be addressed.

It is therefore apparent that an urgent need exists for a control mechanism for a shared virtual experiences that allows for interactive billboards or similar public interactive environments. Such systems would result in more compelling informational, or promotional opportunities.

SUMMARY

To achieve the foregoing and in accordance with the present invention, systems and methods for a controlling a virtual environment are provided. Such systems and methods enable on the fly control over public virtual environments.

In some embodiments, a public display connects to a reflector via a network. The network is often a 5G cellular network. The reflector is often collocated at an edge node of the 5G cellular network. A shared virtual environment is replicated on the public display. This environment includes a plurality of objects. A QR code is displayed on the public display for scanning by a mobile device. The QR code includes instructions to download a controller interface and location of the reflector. After the mobile device scans the QR code and downloads the controller interface, it connects to the reflector and enables control of an avatar and/or a pointer within the shared virtual environment.

The mobile device provides inputs, via the reflector, to the shared virtual environment. This causes mirroring of computations on each of the plurality of objects across the shared virtual environment deterministically. Further, a new message from the reflector with an appended timestamp is transmitted to advance time within the public display. Inputs from the mobile device may include a touchscreen input corresponding to rendered joysticks and buttons, and/or an accelerometer input after position of the mobile device has been calibrated related to the public display.

The controller interface on the mobile device displays a unique identifier linking the mobile device to the avatar. This may be a color that is the same as the avatar's color. Further, the mobile device experiences vibrational haptic feedback responsive to events in the shared virtual environment.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
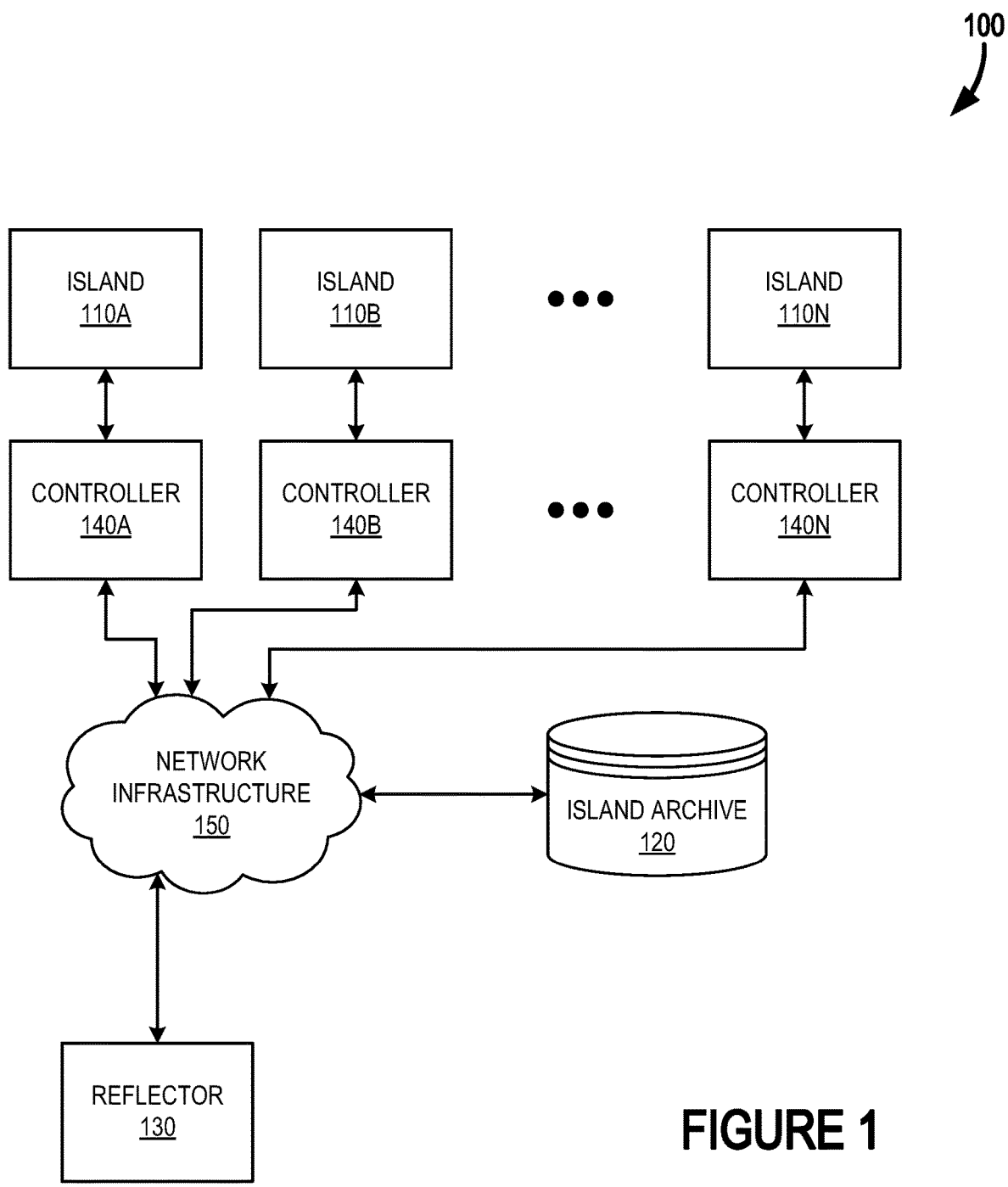
FIG. 1 is an example logical diagram of a system for a shared virtual environment, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for the control of a public virtual environment using a mobile device. In order to effectuate such systems and methods, a backbone of a highly collaborative three-dimensional shared environment is required. Such environments are low latency, low bandwidth and nearly infinitely scalable without the high expense associated with server driven architectures. Further, these environments, through the reflection of messages between the various local machines involved in the shared space, offers perfect environment fidelity that is ideally suited to massive multi-user mobile use cases, shared AR environments, and work environments where perfect fidelity is a requirement.

The architecture for this shared environment is also platform agnostic, being able to be shared across any device. This ultra-portability enables sharing with virtually any other person, regardless of device they are using or platforms deployed on the device.

In order to best disclose how a mobile device may be leveraged to control the public virtual environment, the following disclosure shall first discuss the shared virtual environment architecture and function in detail, followed by a discussion of how a mobile device may be coupled to the shared virtual environment to act as a controller for the environment.

I. Shared Environment Overview

Traditional sharing of environments involves a centralized server model where the "world" is computed on a backend server, rendered in the central server, and renderings are delivered to the individual users via the internet. Such systems essentially "live stream" a video feed from the backend system, and suffer significantly from bandwidth concerns, latency, and extreme server related costs (e.g., limited scalability).

In other traditional systems, the world is still computed on the backend server device, but here updates to the world are then sent to the clients which in turn locally render the view that is presented to the user. While still bandwidth intensive, and costly in terms of backend server requirements, such systems have a marginal improvement over a centrally rendered system in regards to these issues. However, latency can be a significant issue for this type of system, as well as a reduction in fidelity between the users' views.

The present disclosure focuses on a new approach to a shared virtual environment. In this architecture inputs are bound to, and sorted by, a lightweight reflector that guarantees that all copies of the world stay in bit perfect synchronization. In turn, rather than having a central server computing the 'world' local machines independently administer to their perfect fidelity copy of the shared 'world'. Computations are locally performed, and the messaging to ensure that each world copy is synchronized require minimal bandwidth requirements.

These systems and methods provide for a minimal server footprint, with virtually no server compute costs. Likewise, there is no server code required: the clients define the environment, and the reflector servers function only in a time-keeping manner. This decentralized operation allows for the system to be any size and distributed wherever it is desired (including on edge systems or the like). Latencies are minimized significantly below the current methodologies, and bandwidths are likewise a fraction of what a current shared environment requires.

Additionally, by not relying on a centralized backend server, there can be near instant server migrations allowing for latency improvements (as noted before) and security enhancements. Indeed, security and privacy are a built in feature of these systems and methods, as will be discussed in greater detail below.

In order to more clearly describe the architecture enabling these shared environments, attention will now be turned to definitions that will assist in understanding the attendant figures and descriptions. The present architecture relies upon "objects" that are located within the "islands" running on each local computer. These 'objects' each include a state and a behavior. An object can publish events, subscribe to events, and request future events. An object lives in a "domain". The domain assigns an ID to each of its objects, and manages their subscriptions. An object may have "parts". Part IDs are managed by the object. The object itself is a part, too. In some embodiments, an object and its parts can be addressed using a hierarchical URL scheme.

There are "local domains", "shared domains", and "remote domains". A domain contains a collection of objects. The domain manages subscriptions for these objects. A local domain (a.k.a. "client") contains "view" objects. View objects only exist on the user's machine. View objects publish events in response to user input, and generate output in response to events to which they have subscribed. If they request a future event, it is published relative to local wall clock time.

A shared domain (a.k.a. "island") contains "model" objects. An island is isolated from all other domains. An island has an internal clock that only advances when receiving external timestamped events. Future events generated on the island are relative to the island's internal clock. Much of the following discussion will focus on these shared domain islands.

A remote domain (a.k.a. "service") is only defined by its events. The disclosed systems and methods make no assumptions about a service's internal structure. This could be a database server, web service, etc.

Objects within the same domain may communicate directly (e.g., by method calls), or by publishing of and subscribing to events. Objects in different domains can only communicate via "events". Publishing an event informs the objects subscribed to that event. The publishing object may attach data that is sent along with the event. Publishing an event has no side-effects on the publishing object: there is no observable difference in behavior whether there are subscribers to that event or not.

Subscribing to an event means to register a handler to be invoked when that event is published. If the publishing object attached data to the event, the handler will receive that data when invoked. The handler typically is a method of the subscribing object, the data is passed as an argument.

Events are published to a "scope". The scope can be an arbitrary string, but typically is the URL of an object or part, in some embodiments. When subscribing to an event, a scope needs to be specified, too. Only events published to that scope will cause that subscriber's registered handler to be invoked.

When subscribing to a shared domain's events, that domain's objects, their subscriptions, and future event requests (collectively called an island) are replicated to the user's machine. That means, a snapshot is taken of the current state of the island, which is sent via the internet to the user, and the island is recreated from the snapshot. To further facilitate the discussion, FIG. 1 provides an example logical diagram of a system for such a shared virtual environment 100, in accordance with some embodiments. Here there are a series of shared domain islands 110a-n each coupled to one or more controllers 140a-n a reflector 130 and an island archive 120 via a central network infrastructure 150. Islands 110a-n can be easily saved in the island archive 120 database. Likewise, islands may be readily duplicated between different computational devices.

The network 150 is depicted as a network cloud and as such is representative of a wide variety of telecommunications networks, for instance the world wide web, the internet, secure data networks, such as those provided by financial institutions or government entities such as the Department of Treasury or Department of Commerce, internal networks such as local Ethernet networks or intranets, direct connections by fiber optic networks, analog telephone networks, through satellite transmission, or through any combination thereof.

The reflector 130 plays two major roles. First, it acts as the clock for the replicated islands in that it determines when an external event will be executed, as will be discussed in greater detail below. These external events are the only information an island 110a-n has about the actual passage of time, so the island 110a-n simply cannot execute any pending messages in its message queue until it receives one of these time-stamped external messages. The second critical role played by the reflector 130 is to forward any messages it receives from a particular controller 140 to all of the currently registered islands 110a-n. Reflectors 130 can be located almost anywhere on the network and need not be collocated with a particular island 110a-n.

The controller 140a-n is the non-replicated part of the island/controller pair. While the controller 140a-n and each island 110a-n are shown separate in this example diagram, it is entirely possible these two components are functionally co-located within a single local computational device. The role of the controller 140a-n is to act as the interface between the island 110a-n and the reflector 130 and between the user and the island. Its main job is to ship messages around between the other parts of the system. The controller 140a-n also manages the island's message queue, by determining when messages will get executed, as will be described in greater detail below. In some embodiments, a controller 140 can exist without an island 110a-n, acting as a proto-island until the real island is either created or duplicated. In this case it is used to maintain the message queue until either a new island is created or until an existing island is replicated.

Figure 2:
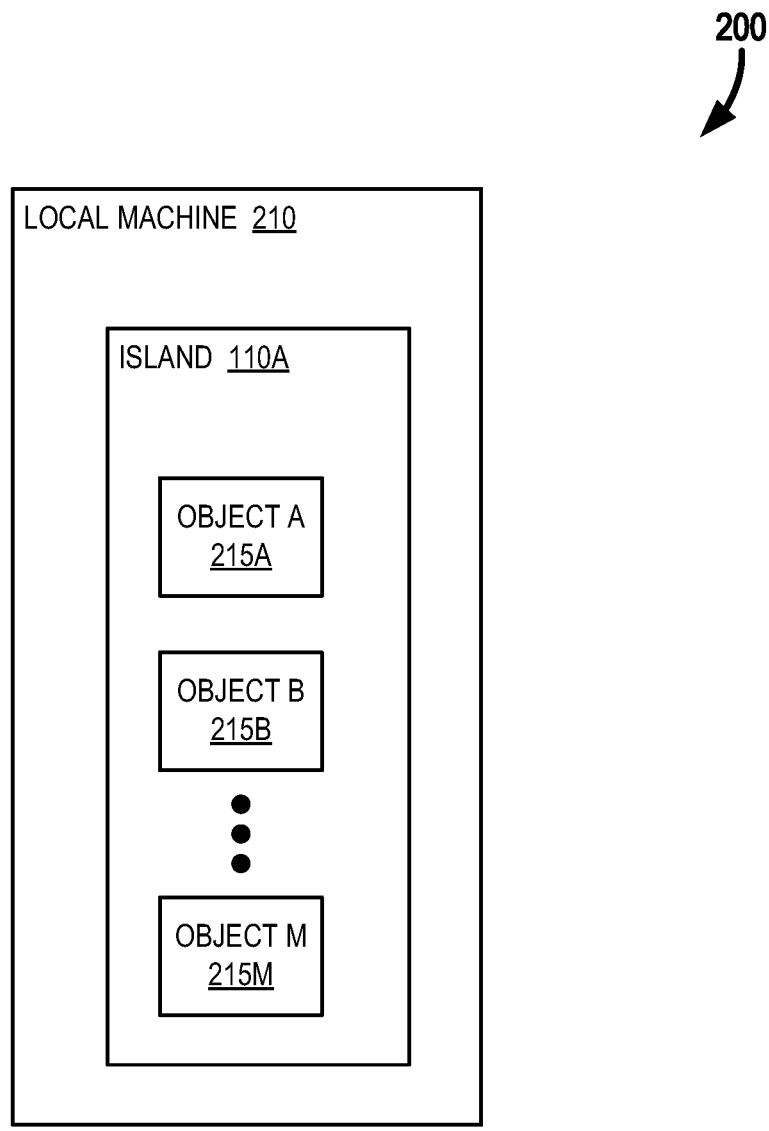
FIG. 2 is an example logical diagram of local machine, in accordance with some embodiments.

Turning to FIG. 2, an example illustration is provided of the local machine 210 which is embodying the local island 110a. Within each island 110a-n are a series of objects 215a-m. As discussed, objects 215a-m include a state and a behavior, may include parts, and can publish events, subscribe to events, and request future events.

Each of the islands 110a-n runs independently on the local computer 210. Each island calculates the operation of objects 215a-m within the island 110a, and generates a rendering for the attendant user. The islands 110a-n operate in replication to one another based upon synchronization messages provided from the reflector 130, as will be discussed in significant detail below.

Figure 3:
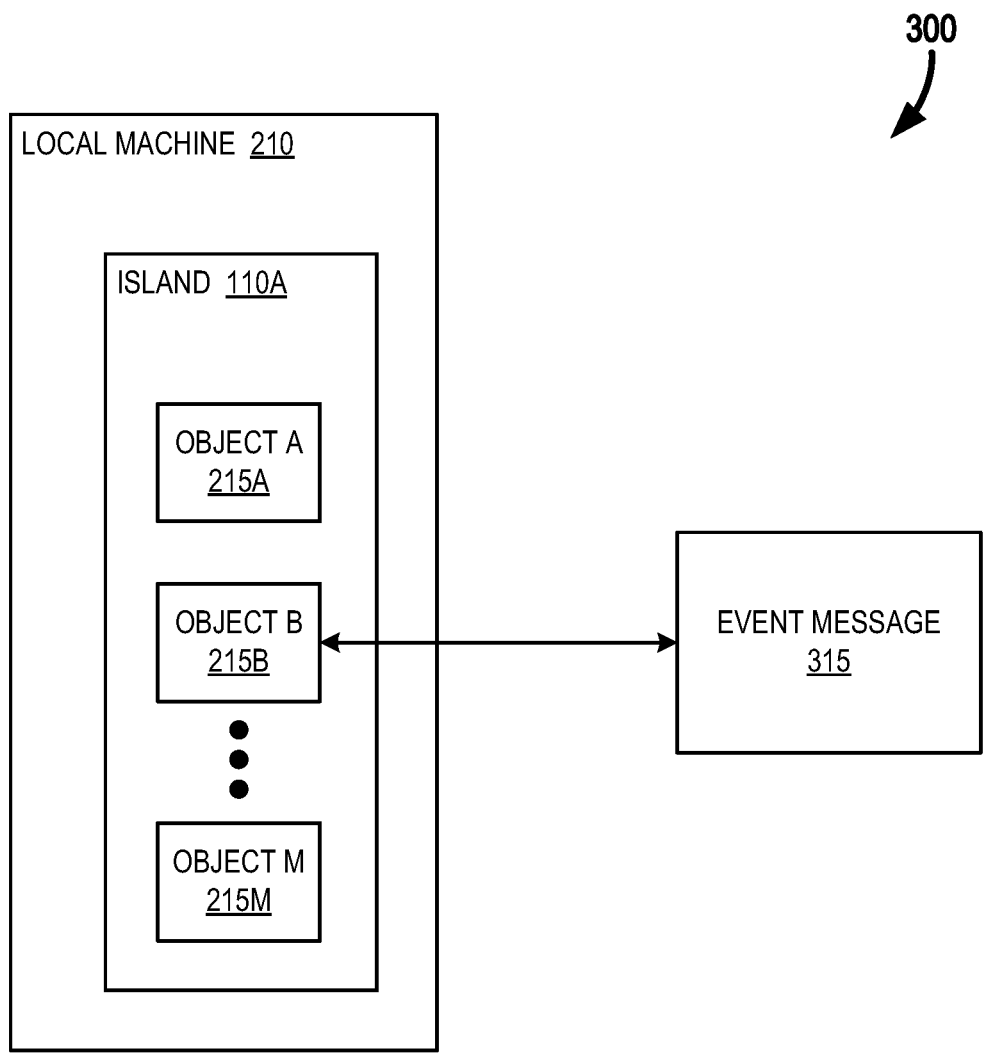
FIG. 3 is an example logical diagram of local machine in communication with an event message, in accordance with some embodiments.

Moving to FIG. 3, it can be seen that objects 215a-m within a given island 110a can only be accessed by reference externally, whereas between objects in the island messages may be sent between the various objects directly. An external event message 315 is used whenever an object is externally accessed. By default, subscription handlers for events published in the same domain are invoked synchronously, just like a direct method call. This makes them very efficient since no buffering is required. In contrast, subscription handlers for events published in a different domain are invoked asynchronously. That means the events are buffered, and only after the code in the publisher's domain has finished running, the queued events are processed. (In a multi-threaded environment, processing of the queued events could start concurrently).

Figure 4:
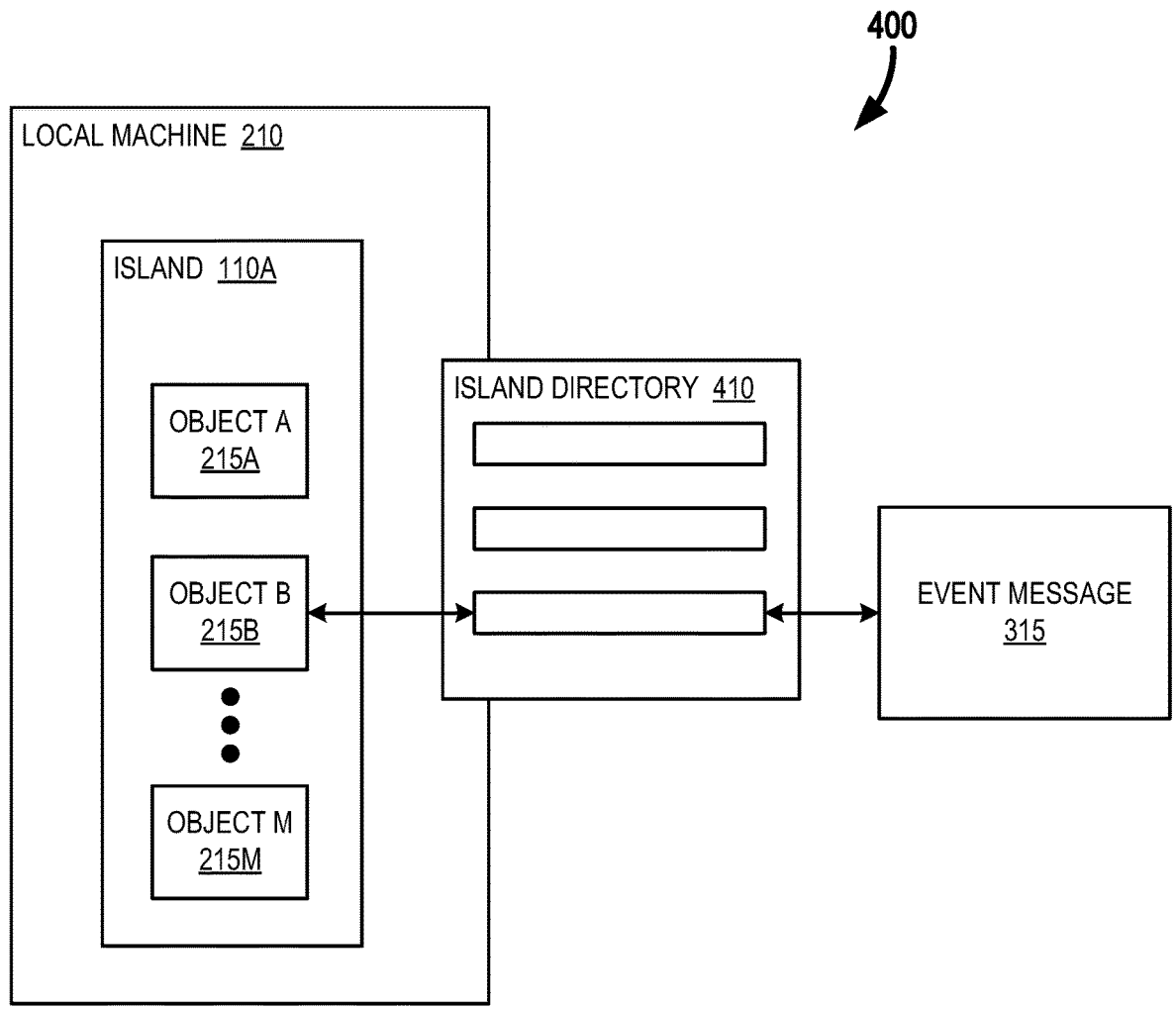
FIG. 4 is an example logical diagram of local machine with an island directory, in accordance with some embodiments.
Figure 5:
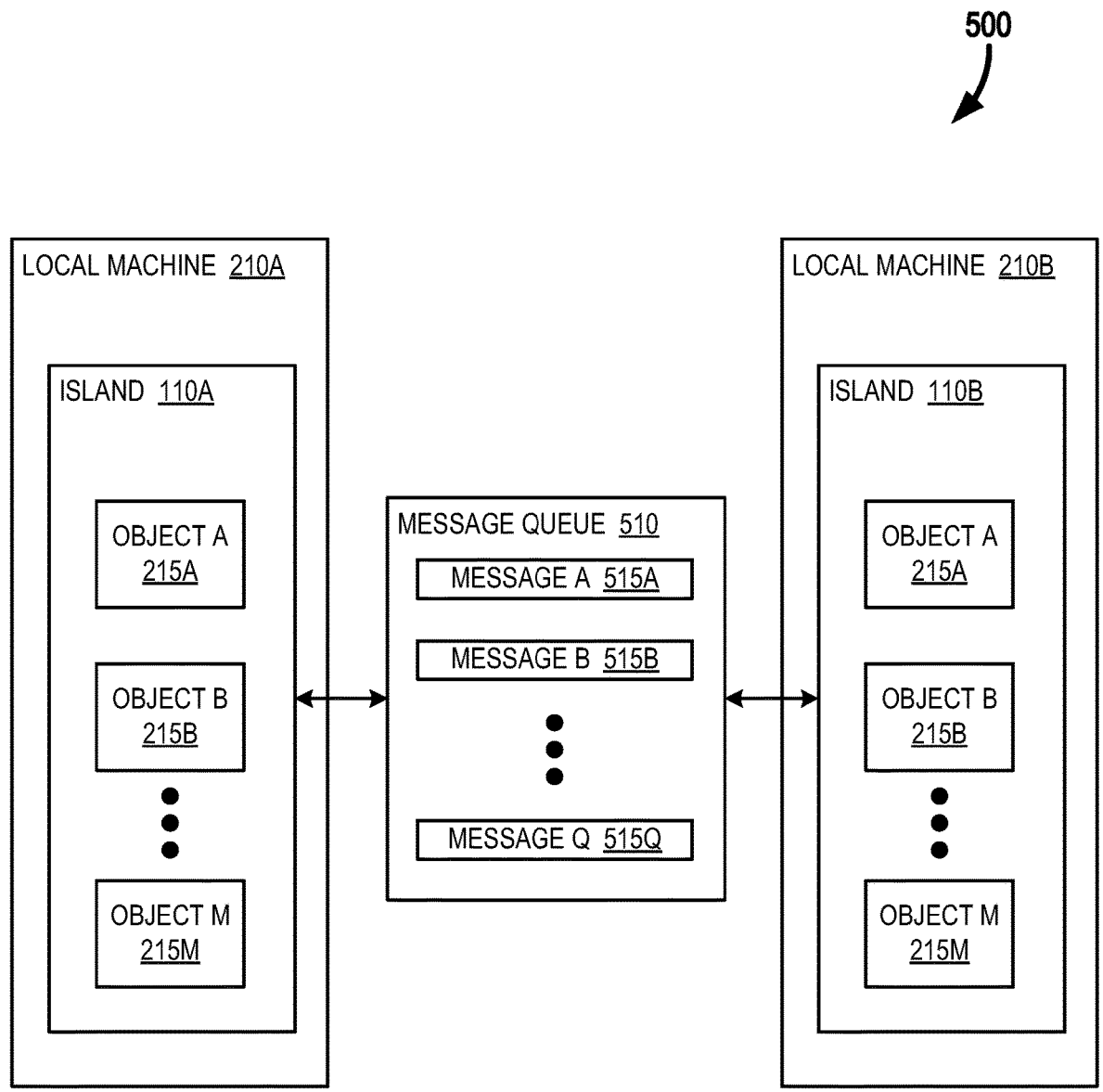
FIG. 5 is an example logical diagram of two local machines in communication with a message queue, in accordance with some embodiments.

Turning to FIG. 4, an example of this queue of events is provided, at 400. The island 110a maintains a list of the named objects in a directory 410, which is accessible externally. The messages may thus be sent indirectly to the object 215a-m in the island 110a via the event message 315. However, rather than rely upon event message 315, in some embodiments it is significantly more efficient to directly replicate events between the various islands. For example, turning to FIG. 5, two local machines 210a and 210b respectively, are communicating via a message queue 510 that includes a series of messages 515a-q which are executed in each island 110a-n in order.

The replicated islands are deterministically equivalent, and are replicated via a checkpoint mechanism that will be discussed in greater detail below. All internal future messages are implicitly replicated, and all external future messages are explicitly replicated. The island structures remain identical, resulting in identical results between the islands.

Figure 6:
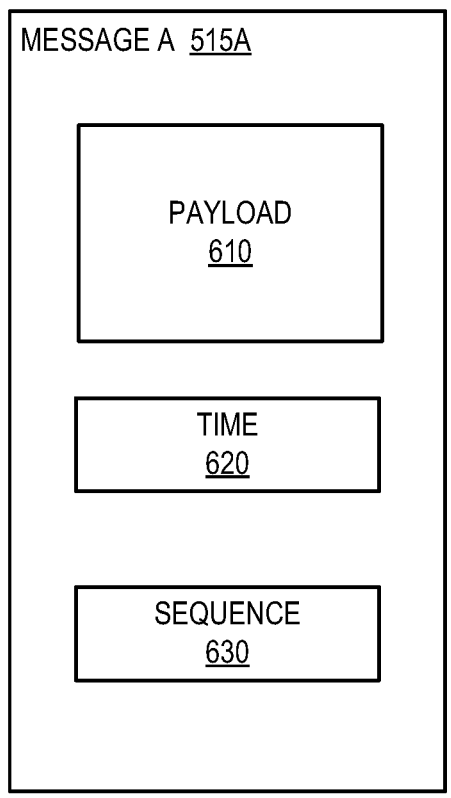
FIG. 6 is an example logical diagram of a message, in accordance with some embodiments.

The messages 515a-q are ordered in the message queue 510 in order of time. An example of a message format is provided in greater detail in relation to FIG. 6. Here it can be seen the message itself is relatively lightweight, resulting in minimal bandwidth overhead. The message 515a includes a payload 610, which may include the target, the message itself, and attendant arguments. The message likewise includes the time 620 and sequence 630. The target indicates which object the message relates to. The message itself is the action taken (e.g., to rotate the object for example). The argument is the condition of the message. For example, if the message is to rotate the object, the argument may indicate the number of degrees or direction in which the object should be rotated. The sequence 630 element is used to order the messages within the queue 510, and therefore determine when the actions of the message are executed. The time 620 is appended by the reflector, and is used to progress execution of messages in the local machine. Messages can be generated either internally, as the result of the execution of a previous message inside of an island, or externally, as the result of an external event usually generated by one of the users of the system.

There is virtually no difference between internally and externally generated messages as far as the internal execution of the island is concerned. A major difference between the two is that the timestamps on externally generated messages are used by an island to indicate an upper bound to which the island can compute its current message queue without danger of computing beyond any possible pending messages.

The definition and manipulation of time plays the central role in how the system is able to create and maintain a replicated island state. The system must be able to guarantee that every internally generated message will be executed in exactly the proper order at exactly the proper time. Externally generated messages must be properly interleaved with the internally generated messages at exactly the right time and order. In order to achieve this, when a new message is generated, it is inserted in the sorted queue based upon its execution time.

Figure 7:
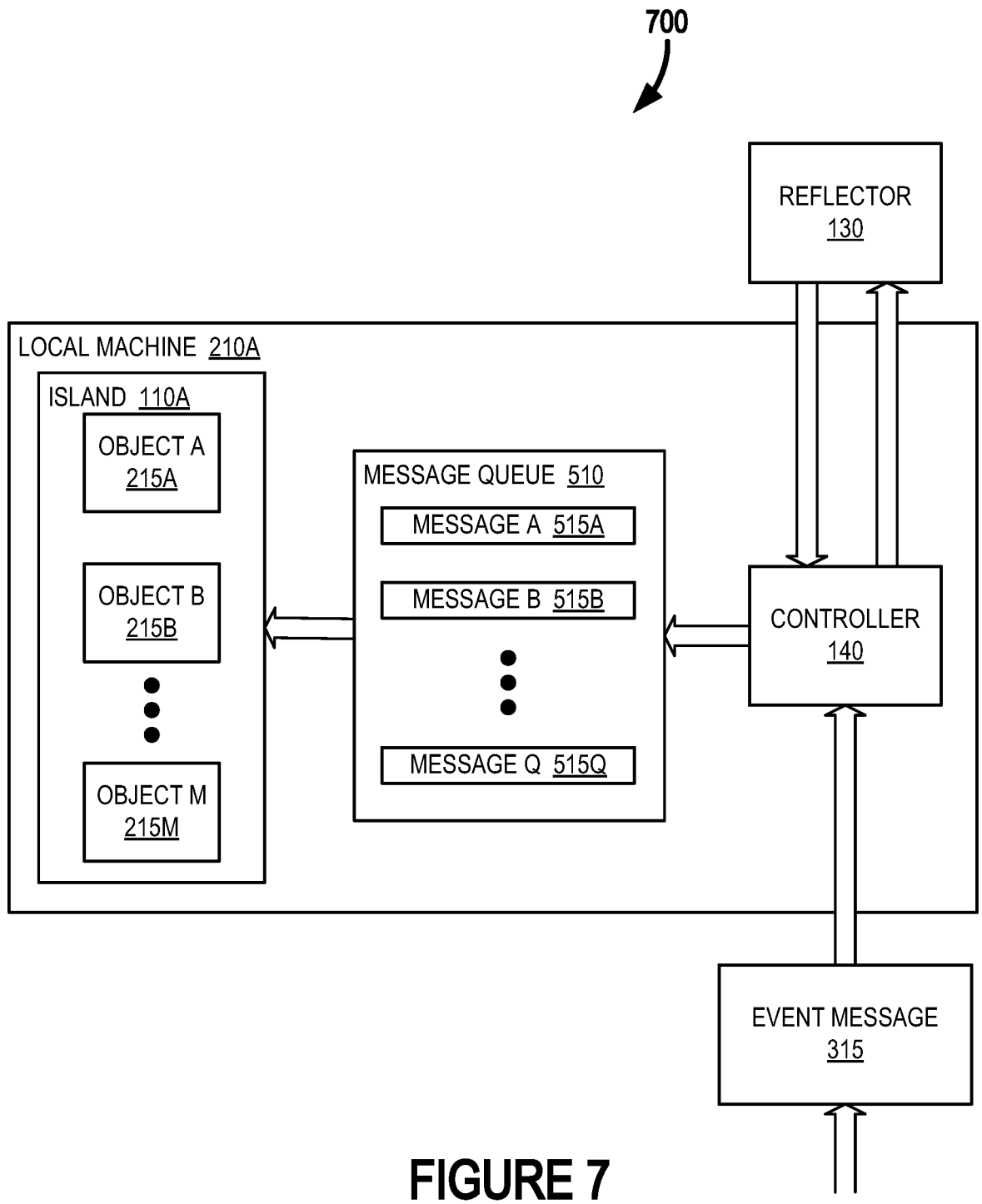
FIG. 7 is an example logical diagram of a local machine operating in conjunction with a controller and reflector in response to an external event message, in accordance with some embodiments.

Turning now to FIG. 7, a logical diagram 700 for the replication of an event is provided. At this point, the island 110a-n replica's state is identical to the original island. The state can only change in response to external events (here the event message 315). The controller 140 manages the flow of external events into the island. The controller 140 connects to the reflector server 130. All replicas of an island 110a-n connect to the same reflector 130.

When an event is published outside of an island 110a-n, and an object inside the island is subscribed to it, the island's controller 140 sends the event to the reflector 130. The reflector 130 puts a timestamp on it, and relays the event to all controllers 140 for all replicas of that island, including the originating controller (hence the name, "reflector"). When the time-stamped event is received from the reflector 130, it is sorted into the island's future event queue 510. Then the simulation is advanced to the event's time stamp. If no event is sent to the reflector from any client within a certain time frame, the reflector manufactures a "heartbeat" event to advance time in the replicated islands.

Figure 8:
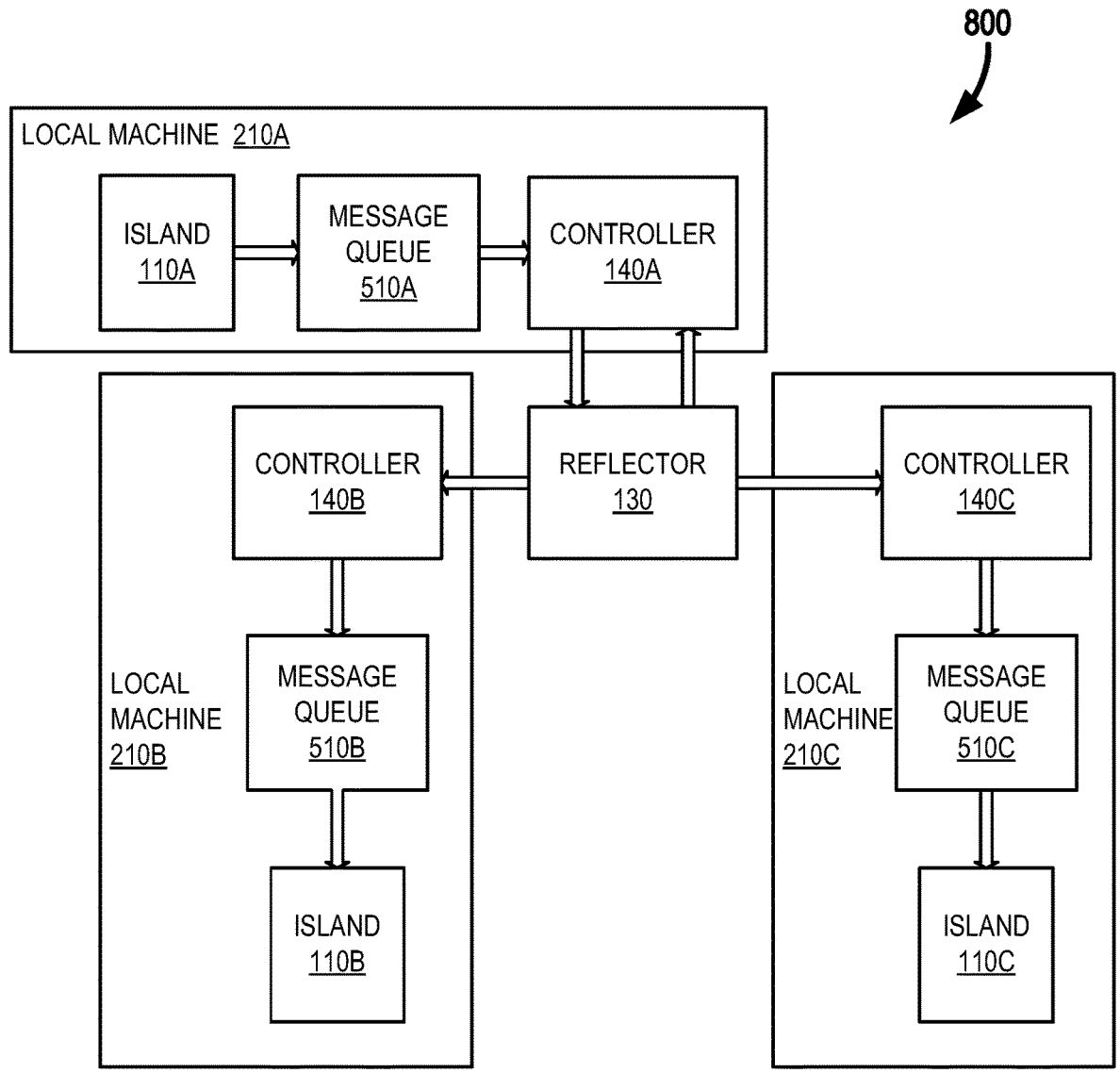
FIG. 8 is an example logical diagram of three local machines synchronizing through a reflector, in accordance with some embodiments.

While this process is illustrated in relation to a single island in reference to FIG. 7, the same process occurs when there are multiple islands with objects subscribed to the same event, as seen in FIG. 8. In this example, local machine 201a includes an island 110a that includes an event that is to be replicated across the other islands. This message is sent via the controller 140a to the reflector 130. The reflector 130 provides a unique timestamp to the message, and returns to the original controller 140a as well as all other controllers 140b and 140c that are mirroring the island. Each of the three controllers 140a-c provide the message to their corresponding message queue 510a-c, respectively. The message is ordered within the queues based upon the timestamp, and the messages are executed in time order in each local machine 210a-c in their respective island 110a-c.

As the state of each island 110a-c was initially identical, and the messages were distributed to each island and executed synchronously, the resulting environments in each island will continue to be identical.

An island's view of time is defined only by the order of the messages it has in the internal queue 510. Islands can only respond to external, atomic, time-stamped messages. These messages are literally the island's clock. Though islands have internal time based messages that can be queued up, these cannot be released for computation until an external time based message has been received which indicates the outer temporal bound to which the island can compute. Thus, even when there is a large number of internal messages ready to be executed, they remain pending until an external time stamped message is received indicating that these internal messages are free to be computed up to and including the newly received message. Each island's message queue is processed by a single thread, so issues with improperly interleaved messages do not arise.

When a message is executed, the time remains atomic in that it does not advance during the execution of this message. The "now" of the message stays the same. When a future message is generated during the current message, the new message always defines its execution time in terms of the current "now" plus an offset value. This offset should generally be greater than zero (though in fact zero is an acceptable value in certain circumstances, it should generally be avoided because if it is infinitely iterated, the system can't advance and will appear to freeze.) If multiple future messages are generated, they will have an identical "now", though they may have different offsets. If two messages are generated at the same "now" and with an identical temporal offset value, an additional message number is used to ensure deterministic ordering of the messages. All this ensures perfect fidelity between mirrored islands.

All of the messages in the island queue are "future" messages. That is, they are messages generated as the result of the execution of a previous internal message with a side effect of sending messages to another object at some predefined time in the future, or they are messages that are generated as the result of an external event—usually from a user—that is posted to the island to execute at some point in the future, usually as soon as possible. All of these messages have time stamps associated with them. The internal messages have time stamps that are determined by the original time of the execution of the message that initially posted the message plus the programmer defined offset. The external messages have a time that is determined by the reflector and is set to a value that is usually closely aligned with an actual time, though it doesn't need to be.

As noted previously, internal future messages are implicitly replicated; they involve messages generated and processed within each island replica, so they involve no network traffic. This means that an island's computations are, and must be, deterministically equivalent on all replicas. As an example, any given external message received and executed inside of a group of replicated islands must in turn generate exactly the same internal future messages that are in turn placed into the islands' message queues. The resulting states of the replicated islands after receipt of the external message must be identical, including the contents of the message queues.

Likewise, external future messages are explicitly replicated. Of course external messages are generated outside of the scope of an island, typically by one of the users of the system. The replication of external messages is handled by the reflector 130 as seen previously.

External non-replicated messages are extremely dangerous and are generally avoided. If a non-replicated message is executed and happens to modify the state of an island it breaks the determinism the island shares with the other replicated copies. This can be extremely detrimental to system fidelity, except in when rendering the contents of an island, but this is extremely well controlled to avoid any breakage of determinism.

Each island has an independent view of time that has no relationship to any other island. For example, a given island could have a speed of time (relative to real time) that is a fraction of another. This is useful for collaborative debugging, for example, where an island can actually have a replicated single step followed by observation by the peers.

Since time is atomic and the external messages act as the actual clock, latency has no impact on ensuring that messages are properly replicated and global island state is maintained. Higher latency users have a degraded feedback experience as a result, but the replication does not suffer in any manner.

II. Replication Methods

Now that the general systems for a replicated collaborative shared environment are have been provided in considerable detail, attention will be turned to processes employed to enable this replicated architecture.

Figure 9:
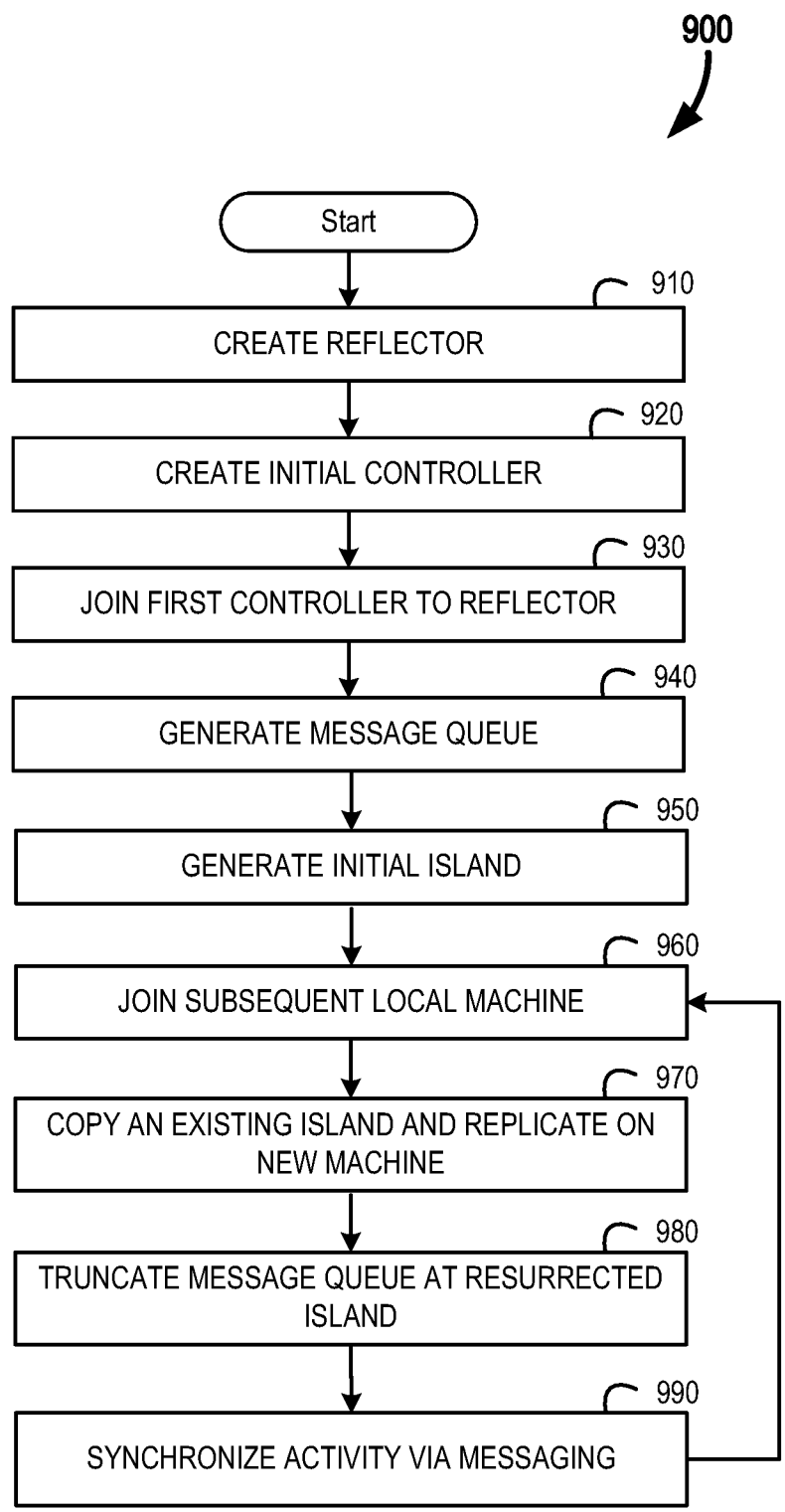
FIG. 9 is a flow diagram for an example process of generation of a shared virtual space via reflection, in accordance with some embodiments.

Turning to FIG. 9, a flow diagram 900 for an example process of generation of a shared virtual space via reflection is provided. In this example process, initially a reflector is created (at 910). The local machine initializing the process will generally host the initial reflector, but this reflector may be dynamically updated in the future as is desired for latency balancing and/or enhanced security purposes. Alternatively, the reflector can be on any accessible machine on the network—either remotely on a WAN, locally on the LAN, or on the same machine that will act as host to the original island. Reflectors are extremely lightweight objects, so they really don't take up many resources, either in space or computation. The reflector has a network address and port number that is how we will find it later.

Subsequently an initial controller is generated as well (at 920). The new controller is generally on the local machine of the user. It can be provided the reflector's address and port number. The initial controller joins the first reflector (at 930), and creates the initial message queue (at 940) by publishing its message stream to the controller. The only messages coming from the reflector at this point are the heartbeat messages—assuming the reflector has been configured to generate these. In any case, the controller is designed to simply begin adding these messages to its message queue. This is actually important when joining an already existent replicated island, because in that case many of the messages that get sent and stored on the queue will be necessary to bring the island replica up to date after it is replicated locally. Joining is view only access. At this point, even if there were an island, the user is not allowed to send messages that might modify it in any way.

Figure 10:
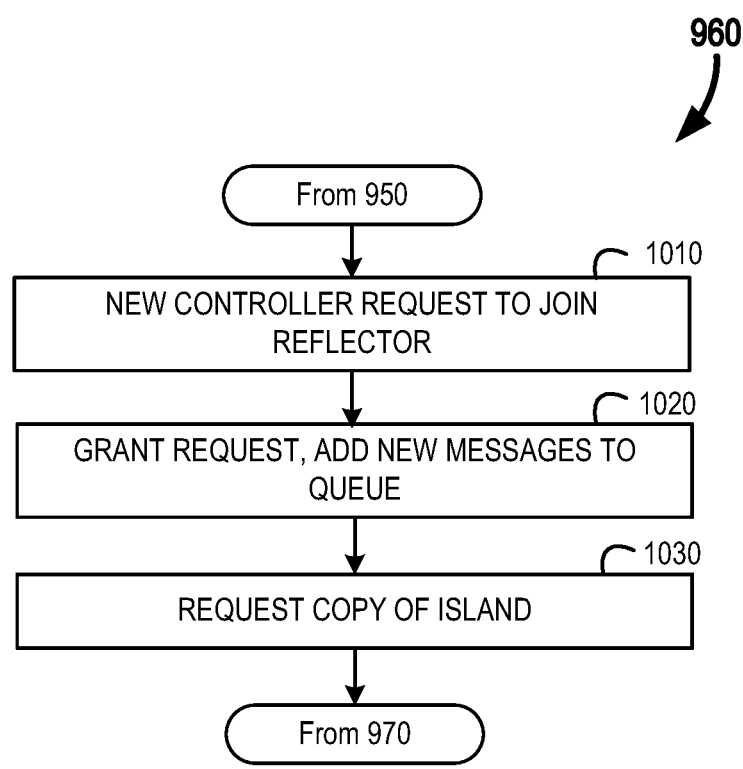
FIG. 10 is a flow diagram for an example process of the joining of a new local machine, in accordance with some embodiments.

Only after the initial queue has been generated is the initial island generated (at 950) by the controller. The user is able to populate the island and have objects within it begin sending their own internal messages to the message queue. This initial island may operate alone for as long as desired. However, when an additional user wishes to join the shared environment, a subsequent local machine needs to join the island network (at 960). FIG. 10 provides a more detailed diagram of this sub-process of subsequent machine joining.

Initially the new controller for the subsequent local machine makes a request to join the reflector (at 1010). The reflector grants the request, and adds messages to the queue of the new controller (at 1020). The controller requests a copy of the island from the reflector (at 1030), which completes the joining process. Returning to FIG. 9, a copy of the initial island needs to be generated, which is then replicated onto the new machine (at 970). Importantly, the message queue for the new machine is then truncated down to the event of the replicated island copy (at 980). This truncation ensures that extraneous actions are not taken/repeated in the newly replicated island.

Figure 11:
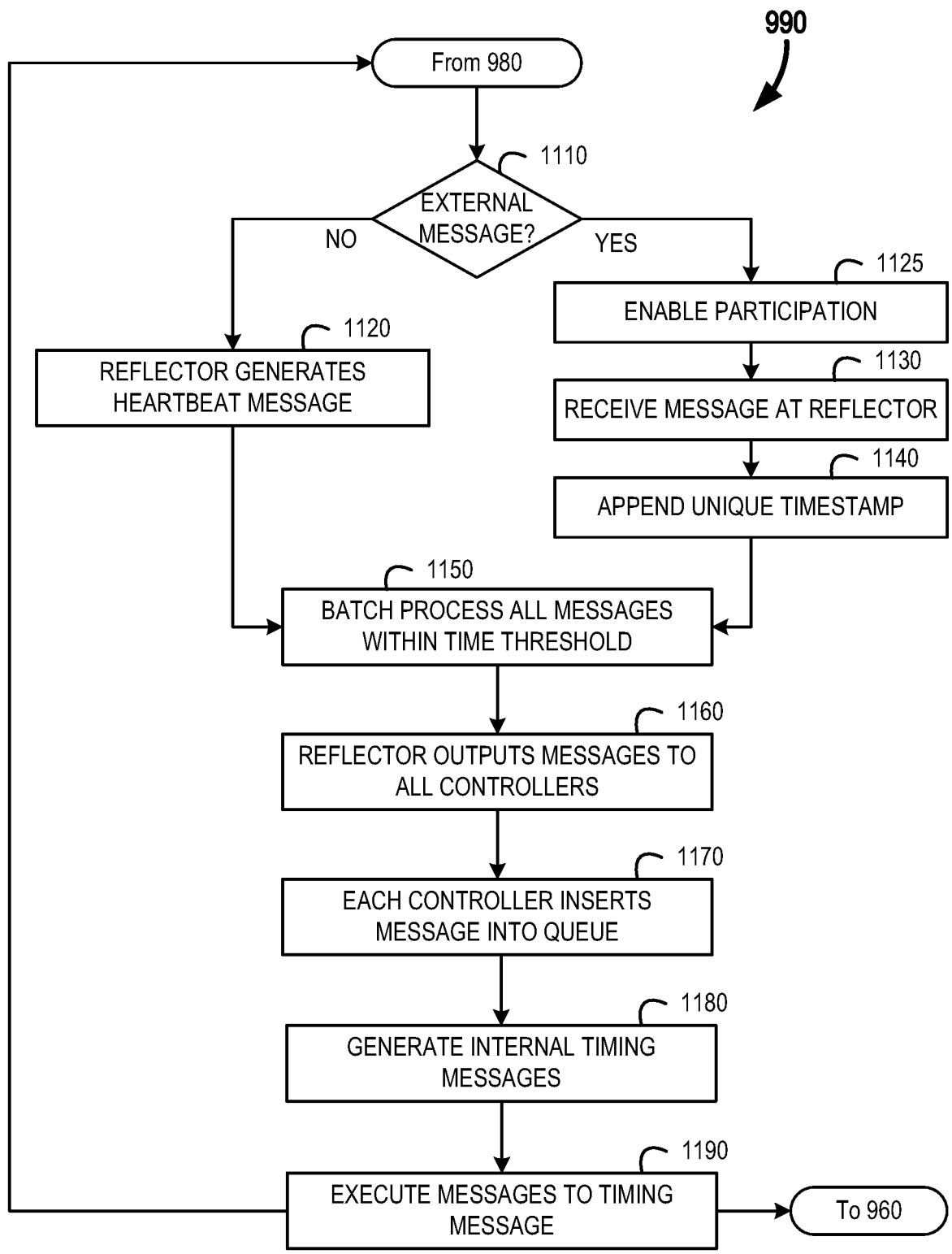
FIG. 11 is a flow diagram for an example process of the synchronizing of the islands, in accordance with some embodiments.
Figure 12:
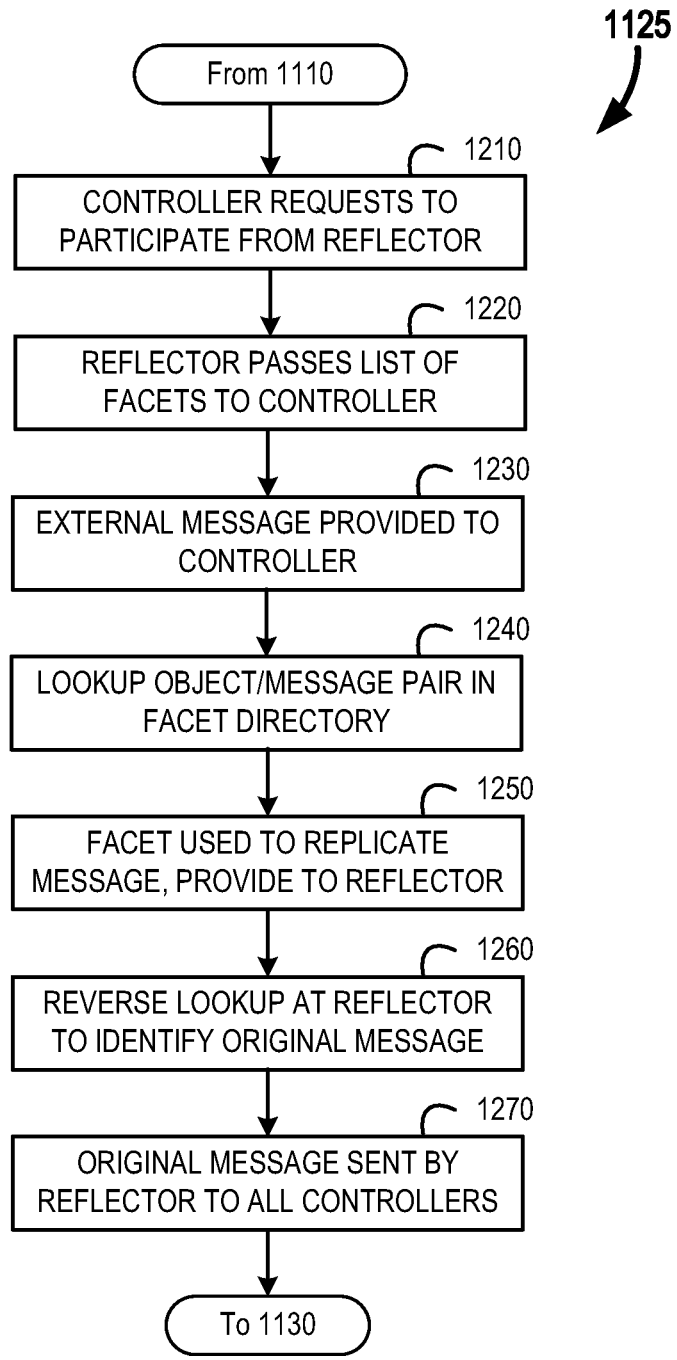
FIG. 12 is a flow diagram for an example process of the participation enablement, in accordance with some embodiments.

Lastly, the activities between the islands progress in synchrony (at 990) which is described in greater detail in relation with the process of FIG. 11. In this example process, initially a determination is made if the message is external or not (at 1110). If it is an internal message, the reflector can generate a heartbeat message (at 1120) since internal messages are unable to progress time (as previously discussed). If it is an external message however, the process must ensure that the local machines are all enabled to participate (at 1125). FIG. 12 describes this participation enablement operation in greater detail. It begins with the controller requesting to participate to the reflector (at 1210). The reflector passes a listing of facets to the controller (at 1220), and the external message is then provided to the controller (at 1230). Each facet dictionary is unique to a controller/island pair. Each user may have a different sized dictionary, corresponding to either more or fewer capabilities granted. The controller cannot send a message if it is not in the facet dictionary, thereby ensuring that only trusted users have the ability to modify a given state in the replicated islands.

The controller performs a lookup of the object/message pair in the facet directory (at 1240) and the facet is used to replicate the message. This replication is then provided back to the reflector (at 1250). At the reflector, a reverse lookup is performed to identify the original message (at 1260), and this original message is sent by the reflector to all controllers (at 1270).

Returning to FIG. 11, after enabling participation of the controllers, the external message is received at the reflector (at 1130), and a unique timestamp is appended to the message by the reflector (at 1140).

Regardless of whether the message is an external message with a timestamp appended, or a simple heartbeat message, the reflector outputs the message to all controllers (at 1160). Optionally, the reflector may collect all messages received in a given time window/threshold and batch process these messages before outputting them to the controllers (at 1150). Batch processing in this manner may cause some approximations in event timing, but for a small enough window these artifacts are not noticeable to a user and cause no degradation in the perceived experience. The benefit of such batch processing however, is a further reduction in required bandwidth, which may be advantageous in a mobile environment or other circumstance with limited connectivity bandwidth.

After the messages have been received by the controllers, they are inserted into the queue at each local island (at 1170) based upon their timing. The messages in the queue may then be executed at each island in sequential order based upon the timing (at 1190). Prior to the step, however, it is also possible to generate internal timing messages based upon the received external message timing (at 1180). These internal "pseudo-heartbeat" signals may be utilized to reduce the dependence upon external heartbeat signals, thereby even further reducing bandwidth requirements.

Synchronization/processing of messages in time order is an ongoing process, and repeats as long as an island is active. Additionally, the system is able to add additional users at any time a new local machine is able and authorized to join the mirrored group.

It should be noted that in each island are 'portals' which are the main access to the various islands. Portals can (but are not required to) be overlaid on top of each other. For example, an island portal may overlay a user interface portal and system control portal, in some embodiments. Portals can include user interface objects used to manipulate content of an island as well.

Islands may also include specialized objects known as 'ghost objects' which are objects that do not actually exist inside the island but behave as if they do. These objects actually exist in a separate island that is accessed by an overlay portal. Examples of these ghost objects could include window frames, user interface handles, billboards, and portals connecting one island to another island. Thus, while islands cannot directly connect to one another they can still appear to be directly connected and act as if they are.

Like ghost objects, another specialized object is a 'reference object' which likewise does not exist within the island. These reference objects are not typically replicated, nor reused across multiple islands. These objects are utilized to render scenes for example. Other examples of reference objects include Tforms, OpenGL objects, and any kind of non-replicated object that an island may require.

As noted before, rendering is not a replicated event. Rendering occurs locally on each machine, and does not leverage a future message. Write protection may be employed to ensure that the island state is not modified by the rendering process (or any other non-replicated event).

III. Public Shared Environment Control

Figure 13:
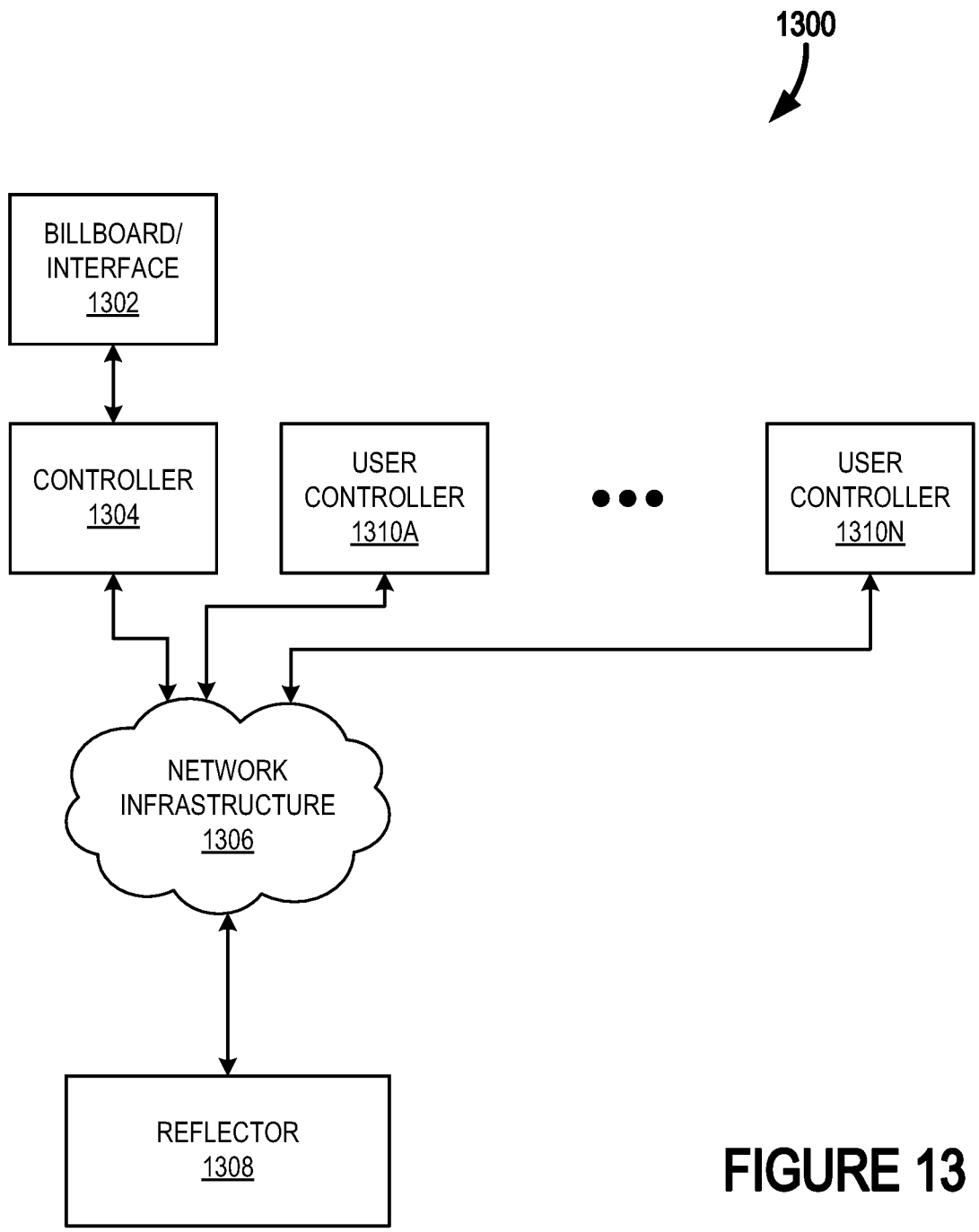
FIG. 13 is an example diagram of a public virtual environment being controlled by a mobile device, in accordance with some embodiments.

Turning to the heart of the present disclosure, systems and methods of controlling a shared public environment are provided. In FIG. 13 a diagram for user control of a billboard displaying a shared virtual world is provided, at 1300. For the purpose of this disclosure the term "billboard" will be utilized. It should be understood that the term "billboard" refers to any interface that is available to the public, and may include displays at bus/train stops, information kiosks, large scale displays, or the like. The billboard 1302 is coupled to a controller 1304, which connects to a reflector 1308 via a network 1306. For the present instance, often the network 1306 is a cellular network that allows the billboard's controller to access the reflector, and user controllers 1310a-n to likewise access the reflector 1308. In some embodiments, the network is a 5G cellular connection, or a local-area network.

Generally, the reflector resides at a 5G (or other cellular network) edge server. In such situations the billboard/public display and the mobile device/controller connect through the same 5G network. In some particular embodiments, the reflector may even reside within the billboard's computer system itself (not displayed). In such situations it may also be possible that the controllers 1310a-n directly couple to the billboard system 1302 via a Bluetooth or similar connection, or via a 5G (or other suitable) connection.

The billboard computing system 1302, with its controller 1304, may interact with the reflector 1308 in the manner disclosed in the above section to generate and maintain a shared virtual environment. In some embodiments, many billboard systems may all operate in tandem within the same virtual environment (not illustrated) in the manner also described above. For the sake of brevity and clarity, details of the controller and reflector interactions required to generate the virtual environment shall be omitted from this section, as they have been exhaustively described previously.

Figure 14:
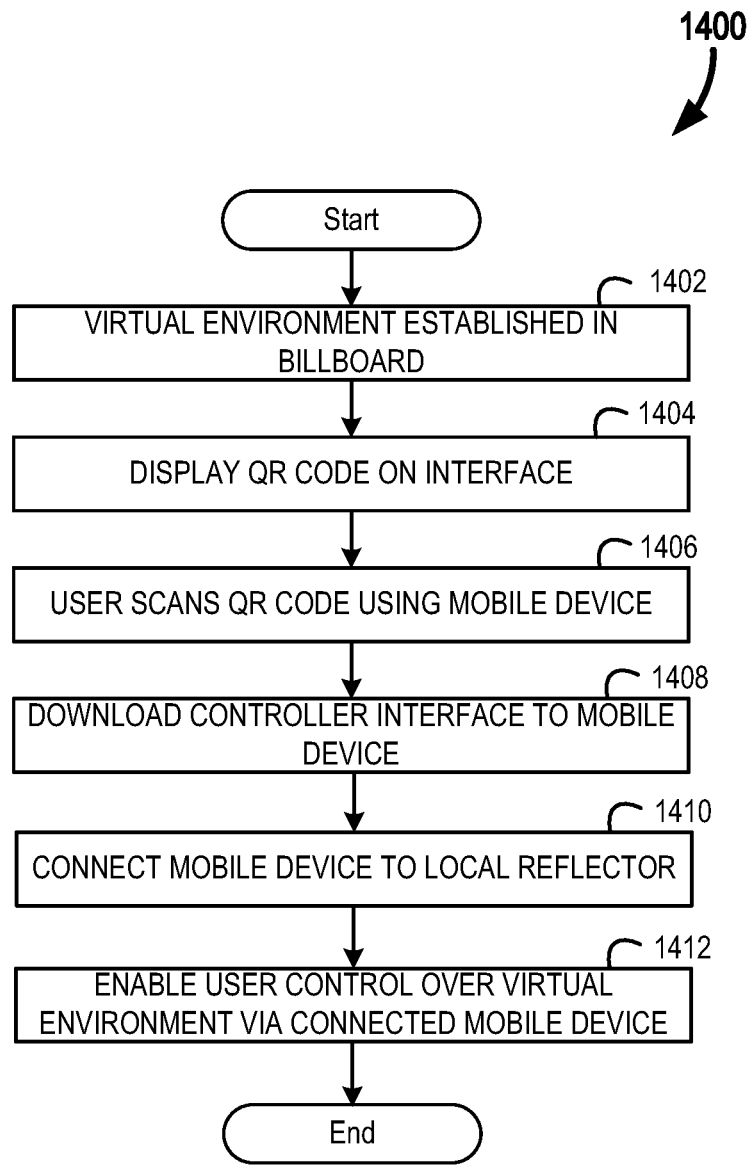
FIG. 14 is a flow diagram for an example process for controlling a public virtual environment using a mobile device, in accordance with some embodiments.

Moving to FIG. 14, a flow diagram 1400 of the method for controlling the virtual environment is provided. In this method a virtual environment is established at the billboard (or across multiple billboards) using the controller and reflector as previously discussed (at 1402). The billboard also displays a QR code, or similar identification code (at 1404). This QR code allows a user of a mobile device, such as a cellular phone, to scan the code (at 1406). This allows the mobile device to download a controller interface (which is a lightweight application) and identifies the reflector in use (at 1408).

The controller device then connects to the local reflector (at 1410) generally via a cellular connection. Again, the reflector is generally embodied on a computer system located at an edge cellular base station, or within the billboard itself. Subsequently, the user is capable of controlling the virtual environment via the connected mobile device/controller (at 1412).

Figure 15:
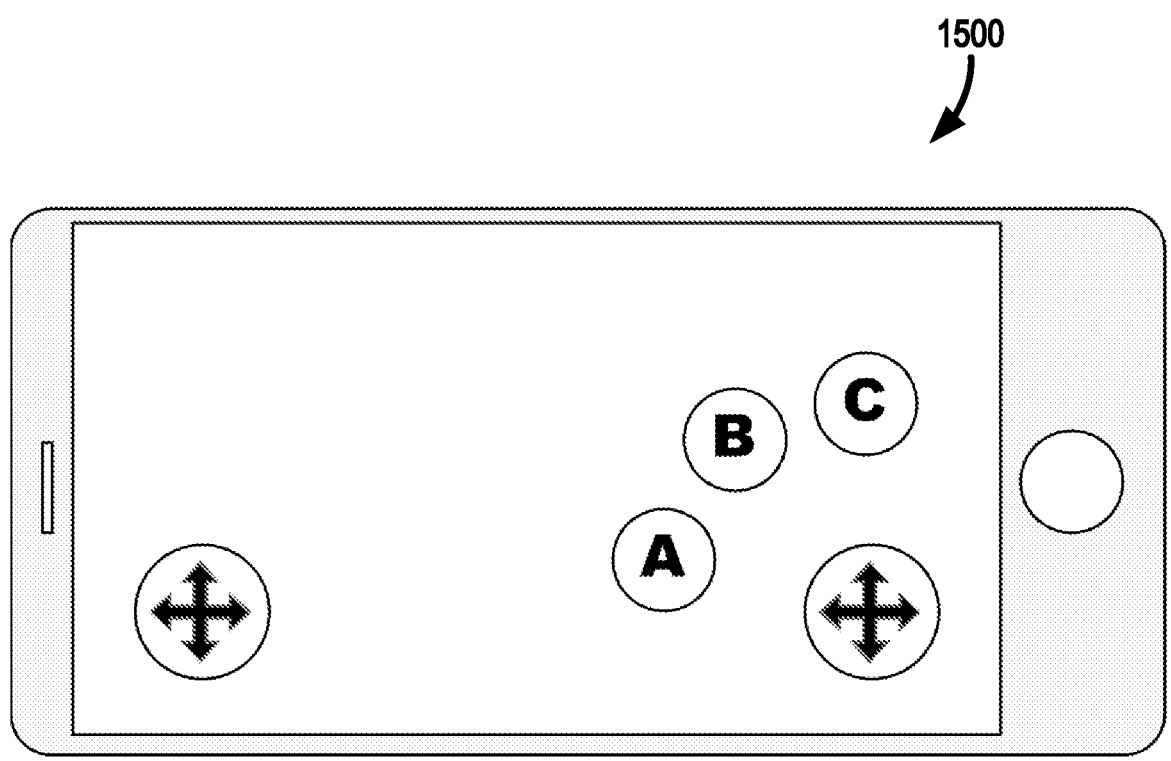
FIG. 15 is an example diagram of a mobile device being used as a controller, in accordance with some embodiments.

Turning to FIG. 15, the display on the mobile device is presented (at 1500). It should be noted that this is but one example of a controller interface, and button and joystick number and layout may differ based upon needs and desired types of controls. For example depending upon the type of virtual environment the user is interacting with, it may be sufficient to have a single joystick and button (for movement and jumping respectively). More complex environments may require more dynamic movement (two joysticks) and buttons for interacting with the environment in many ways (more than one button arrangement). The present illustration 1500 provides such a controller interface.

Although not illustrated, the mobile device/controller may also be used to control the virtual environment in alternate ways. For example, if the virtual environment were running a racing game, the mobile device's accelerometers/gyroscopes may be leveraged to "steer" a vehicle in the game. Essentially mobile device orientation becomes the means for controlling the avatar within the virtual environment. Likewise, for a "shooting" game, the controller may be used to "aim" in the game. This would be accomplished by aiming the phone at a target, and calibrating the phone orientation (by pressing a calibration button on the mobile device screen. Once calibrated, the user may use the mobile device like a laser pointer on the public display/billboard, directly controlling the position of a controller or other pointer on the display.

Another method of control may include holding the mobile device in a portrait mode. The mobile device displays a normal application interface with buttons and menus. However, the user's choices and actions are immediately reflected in the behavior of the public display.

The background of the controller may be a specific color, in some embodiments. This color may correspond to a specific avatar within the virtual environment, for example. So, a red background may correspond to a red colored avatar. Alternatively, the controller may display other unique avatar information or even an augmented reality type display.

In some embodiments, the vibration capabilities of the mobile device may be leveraged to perform haptic feedback for events that occur on the public display. (For example, an on-screen explosion might cause your phone to vibrate). In yet other embodiments, the forward-facing camera of the mobile device may be used to capture facial expressions or gestures that are then used to control objects on the public display/billboard. In many cases, some subset or combination of the above features may be used for control of the virtual environment.

IV. System Embodiments

Figure 16A:
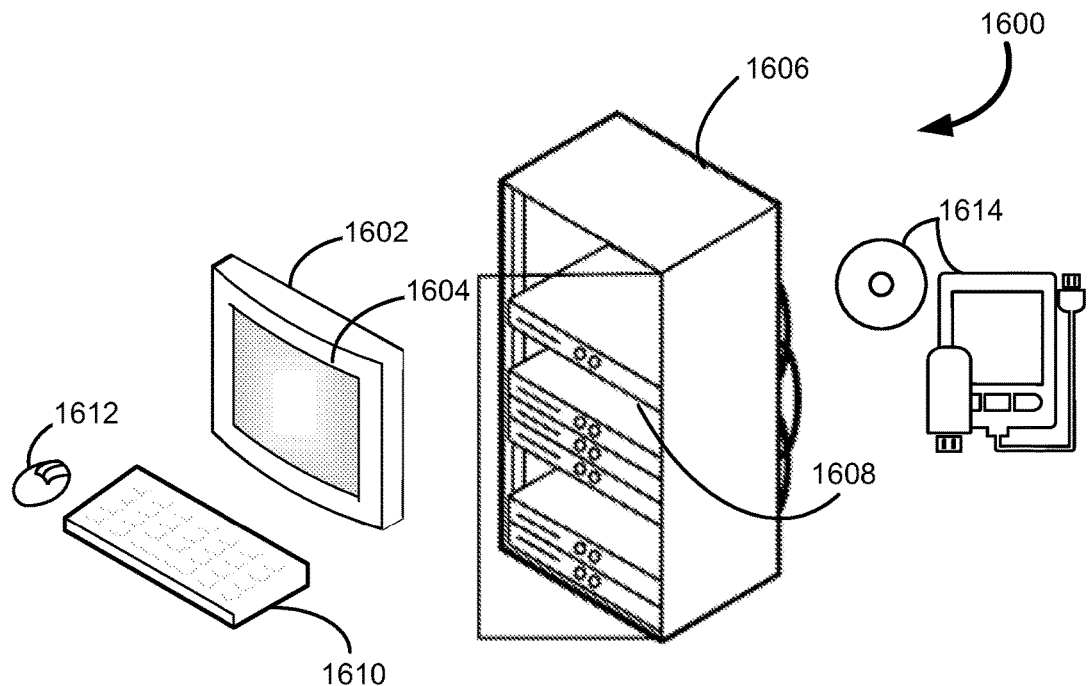
FIGS. 16A and 16B are example illustrations of a computer system capable of embodying the current invention.

Now that the systems and methods for the control of a collaborative virtual environment have been described, attention shall now be focused upon systems capable of executing the above functions. To facilitate this discussion, Turning now to FIGS. 16A and 16B, a Computer System 1600, which is suitable for implementing embodiments of the present invention, is illustrated. FIG. 16A shows one possible physical form of the Computer System 1600. Of course, the Computer System 1600 may have many physical forms ranging from a printed circuit board, an integrated circuit, and a small handheld device up to a huge super computer. Computer system 1600 may include a Monitor/terminal 1602, a Display 1604, a Housing 1606, one or more Storage Drives and server blades 1608, a Keyboard 1610, and a Mouse or other input device 1612. Storage 1614 is a computer-readable medium used to transfer data to and from Computer System 1600.

Figure 16B:
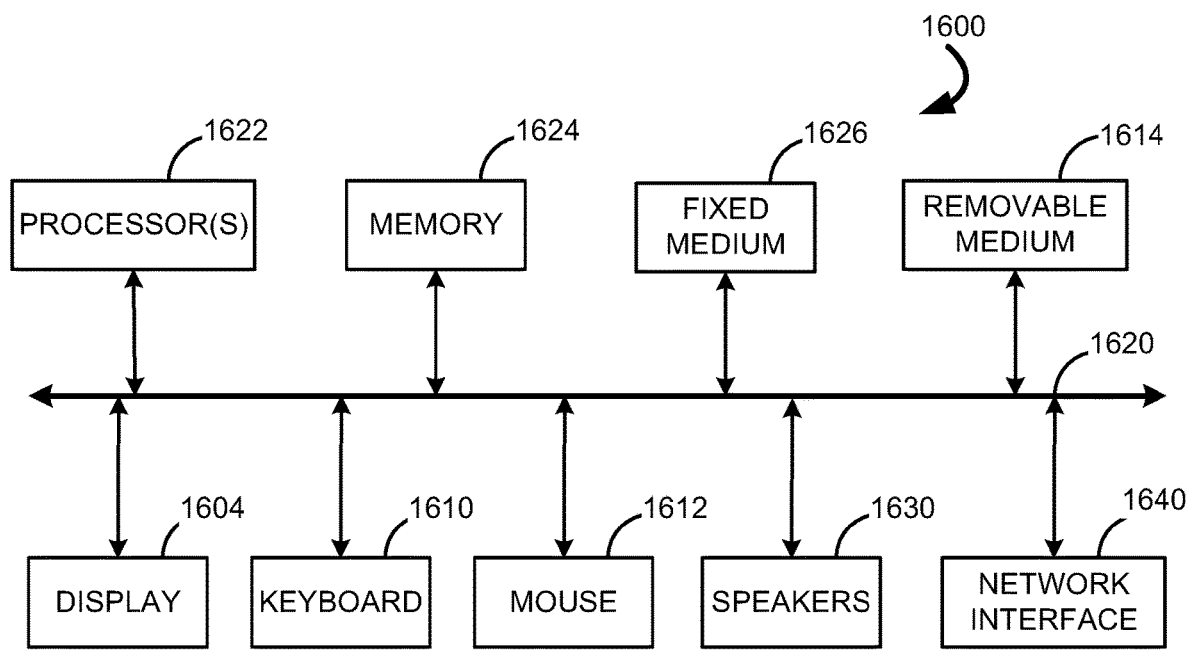

FIG. 16B is an example of a block diagram for Computer System 1600. Attached to System Bus 1620 are a wide variety of subsystems. Processor(s) 1622 (also referred to as central processing units, or CPUs) are coupled to storage devices, including Memory 1624. Memory 1624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Storage 1626 may also be coupled bi-directionally to the Processor 1622; it provides additional data storage capacity and may also include any of the computer-readable media described below. Fixed Storage 1626 may be used to store programs, data, and the like and is typically a secondary storage medium (such as a hard disk) that is slower than primary storage. It will be appreciated that the information retained within Fixed Storage 1626 may, in appropriate cases, be incorporated in standard fashion as virtual memory in Memory 1624. Removable Storage 1614 may take the form of any of the computer-readable media described below.

Processor 1622 is also coupled to a variety of input/output devices, such as Display 1604, Keyboard 1610, Mouse 1612 and Speakers 1630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Examples of typical input/output devices that are particularly relevant to a virtual 3D environment being proposed may include direct interfaces to the gaming software, and to displays for the game players (or in the present case, the public displays).

Processor 1622 optionally may be coupled to another computer or telecommunications network using Network Interface 1640. With such a Network Interface 1640, it is contemplated that the Processor 1622 might receive information from the network or might output information to the network in the course of performing the above-described virtual environments. Furthermore, method embodiments of the present invention may execute solely upon Processor 1622 or may execute over a network such as the Internet or a wireless network (e.g., a cellular network) in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1600 can be controlled by operating system software that includes a file management system, such as a storage operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for controlling a shared virtual environment comprising:
    connecting a public display to a reflector via a network;
    replicating a shared virtual environment including a plurality of objects at the public display;
    displaying a QR code on the public display, wherein the QR code includes instructions to download a controller interface and location of the reflector;
    connecting a mobile device to the reflector via the network;
    downloading the controller interface to the mobile device;
    providing control input from the mobile device via the controller interface to the reflector;
    generating a series of messages at the reflector responsive to the control input;
    sharing the messages with at least one other reflector; and
    deterministically executing the messages across the reflector and all of the at least one other reflector up to a heartbeat timing message.

2. The method of claim 1, wherein the input from the mobile device is a touchscreen input corresponding to rendered joysticks and buttons.

3. The method of claim 1, wherein the input from the mobile device is an accelerometer input after position of the mobile device has been calibrated related to the public display.

4. The method of claim 1, wherein the mobile device downloads the controller interface and connects to the reflector responsive to scanning the QR code.

5. The method of claim 1, wherein the network is a 5G cellular network.

6. The method of claim 5, wherein the reflector is collocated at an edge node of the 5G cellular network.

7. The method of claim 1, wherein the controller controls at least one of an avatar and a pointer in the shared virtual environment.

8. The method of claim 7, wherein the controller interface on the mobile device displays a unique identifier linking the mobile device to the avatar.

9. The method of claim 8, wherein the unique identifier is a color that is the same as the avatar's color.

10. The method of claim 1, wherein the mobile device experiences vibrational haptic feedback responsive to events in the shared virtual environment.

11. A computer program product embodied on a non-transitory medium which when executed on a computer system performs the steps of:

connecting a public display to a reflector via a network;
replicating a shared virtual environment including a plurality of objects at the public display;
displaying a QR code on the public display, wherein the QR code includes instructions to download a controller interface and location of the reflector;
connecting a mobile device to the reflector via the network;
downloading the controller interface to the mobile device;
providing control input from the mobile device via the controller interface to the reflector;
generating a series of messages at the reflector responsive to the control input;
sharing the messages with at least one other reflector; and
deterministically executing the messages across the reflector and all of the at least one other reflector up to a heartbeat timing message.

12. The computer program product of claim 11, wherein the input from the mobile device is a touchscreen input corresponding to rendered joysticks and buttons.

13. The computer program product of claim 11, wherein the input from the mobile device is an accelerometer input after position of the mobile device has been calibrated related to the public display.

14. The computer program product of claim 11, wherein the mobile device downloads the controller interface and connects to the reflector responsive to scanning the QR code.

15. The computer program product of claim 11, wherein the network is a 5G cellular network.

16. The computer program product of claim 15, wherein the reflector is collocated at an edge node of the 5G cellular network.

17. The computer program product of claim 11, wherein the controller controls at least one of an avatar and a pointer in the shared virtual environment.

18. The computer program product of claim 17, wherein the controller interface on the mobile device displays a unique identifier linking the mobile device to the avatar.

19. The computer program product of claim 18, wherein the unique identifier is a color that is the same as the avatar's color.

20. The computer program product of claim 11, wherein the mobile device experiences vibrational haptic feedback responsive to events in the shared virtual environment.

\* \* \* \* \*